United States Patent [19]

Reimann

[11] Patent Number: 4,467,623
[45] Date of Patent: Aug. 28, 1984

[54] COUNTERFLOW ABSORBER FOR AN ABSORPTION REFRIGERATION SYSTEM

[75] Inventor: Robert C. Reimann, Lafayette, N.Y.

[73] Assignee: The United States of America as represented by the United States Department of Energy, Washington, D.C.

[21] Appl. No.: 456,132

[22] Filed: Jan. 6, 1983

[51] Int. Cl.$^3$ ............................................. F25B 37/00
[52] U.S. Cl. ........................................ 62/494; 62/475; 62/476
[58] Field of Search ............................ 62/476, 494, 475

[56] References Cited

U.S. PATENT DOCUMENTS

| | | |
|---|---|---|
| 395,512 | 12/1889 | Piel . |
| 437,192 | 9/1890 | Gray, Jr. . |
| 1,930,657 | 10/1933 | Nelson . |
| 1,993,518 | 3/1935 | Maiuri .................................. 62/494 |
| 2,552,071 | 5/1951 | Terrill, Jr. ........................ 62/494 X |
| 3,037,361 | 6/1962 | Merrick . |
| 3,038,316 | 6/1962 | Bourne . |
| 3,204,425 | 9/1965 | Rush . |
| 3,210,057 | 10/1965 | Deady, Jr. et al. . |
| 3,353,369 | 11/1967 | Whitlow .............................. 62/494 |
| 3,367,135 | 2/1968 | Greacen et al. ...................... 62/475 |
| 3,390,544 | 7/1968 | Eberz . |
| 3,423,951 | 12/1969 | Eisberg . |
| 4,338,268 | 7/1982 | Wilkinson et al. ............... 62/494 X |

Primary Examiner—Lloyd L. King
Attorney, Agent, or Firm—David L. Adour

[57] ABSTRACT

An air-cooled, vertical tube absorber for an absorption refrigeration system is disclosed. Strong absorbent solution is supplied to the top of the absorber and refrigerant vapor is supplied to the bottom of the absorber to create a direct counterflow of refrigerant vapor and absorbent solution in the absorber. The refrigeration system is designed so that the volume flow rate of refrigerant vapor in the tubes of the absorber is sufficient to create a substantially direct counterflow along the entire length of each tube in the absorber. This provides several advantages for the absorber such as higher efficiency and improved heat transfer characteristics, and allows improved purging of non-condensibles from the absorber.

3 Claims, 3 Drawing Figures

COUNTERFLOW ABSORBER FOR AN ABSORPTION REFRIGERATION SYSTEM,

STATEMENT AS TO RIGHTS TO INVENTIONS MADE UNDER FEDERALLY-SPONSORED RESEARCH AND DEVELOPMENT

The United States government has rights in this invention pursuant to contract No. DE-AC03-77CS31587 awarded by the United States Department of Energy.

BACKGROUND OF THE INVENTION

The present invention relates to absorption refrigeration systems. More particularly, the present invention relates to absorbers for absorption refrigeration systems.

There are many different kinds of absorbers for absorption refrigeration systems. For example, an absorber may comprise a relatively large, closed vessel with baffle plates mounted therein to provide a tortuous passageway for refrigerant vapor and absorbent solution flowing in the absorber. The refrigerant vapor and the absorbent solution may be admitted at opposite ends of the closed vessel to provide a type of counterflow in the vessel wherein the flow streams of the vapor and the solution are randomly directed relative to each other. This kind of absorber is usually cooled by passing a cooling fluid through tubing located inside the absorber vessel.

In certain situations, it is desirable to provide an air-cooled absorber comprised of vertical tubes in which absorbent solution and refrigerant vapor are brought into contact by parallel flow streams of these fluids flowing inside each tube. Usually, the absorbent solution and the refrigerant vapor are supplied to the tops of the tubes and flow down to the bottoms of the tubes. The absorber is cooled by circulating cool air over the outside surfaces of the absorber tubes. However, in general, these conventional vertical tube absorbers do not operate as efficiently as possible. For example, it has been observed that weak absorbent solution produced by these absorbers does not always contain as much refrigerant as theoretically possible thus indicating that the performance of the absorber can be improved. Also, from a theoretical thermodynamic viewpoint, these parallel flow vertical tube absorbers have a relatively large thermodynamic driving force at the top of the absorber, where relatively strong absorbent solution is in contact with relatively high pressure refrigerant vapor, and a relatively small thermodynamic driving force at the bottom of the absorber, where relatively weak absorbent solution is in contact with relatively low pressure refrigerant vapor. This indicates that maximum performance of the absorber is not being obtained along the entire length of each of the absorber tubes since most of the absorption will occur at the top of the absorber tubes where the large driving force is present, and relatively little absorption will occur at the bottom of the absorber tubes where the relatively small driving force is present.

Also, parallel flow vertical tube absorbers present problems with respect to purging of non-condensibles which are usually purged from the bottom of the absorber where the relatively weak absorbent solution is collected. Non-condensibles have a tendency to flow up into the tubes of the absorber and not all of the non-condensibles can be purged from the bottom of the absorber.

SUMMARY OF THE INVENTION

Therefore, an object of the present invention is to improve the efficiency of vertical tube absorbers in absorption refrigeration systems.

Another object of the present invention is to provide improved purging of non-condensibles from a vertical tube absorber in an absorption refrigeration system.

These and other objects of the present invention are attained by an absorption refrigeration system having a vertical tube absorber with a counterflow of absorbent solution and refrigerant vapor in the tubes of the absorber. The refrigeration system is designed so that the volume flow rate of refrigerant vapor to the absorber is sufficient to create a flow of refrigerant vapor along the entire length of each of the tubes in the absorber which is substantially in direct opposition to the flow of absorbent solution in each of the tubes in the absorber. This direct counterflow of refrigerant vapor and absorbent solution provides for a more uniform thermodynamic driving force along the length of each of the absorber tubes thus improving the efficiency of the absorber. Also, counterflow may increase turbulence along the length of each of the absorber tubes thereby improving heat transfer to a heat exchange medium flowing over the outside surfaces of the tubes, thus further improving the efficiency of the absorber.

Non-condensibles are purged from the top of the absorber where relatively strong absorbent solution is entering the absorber. The presence of the relatively strong absorbent solution at the top of the absorber draws refrigerant vapor to the top of the absorber thereby sweeping non-condensibles out the top of the absorber tubes where they may be easily collected for purging.

BRIEF DESCRIPTION OF THE DRAWINGS

Other objects and advantages of the present invention will be apparent from the following detailed description in conjunction with the accompanying drawings, wherein like reference numerals identify like elements, and in which.

DESCRIPTION OF THE PREFERRED EMBODIMENT

Figure 1:
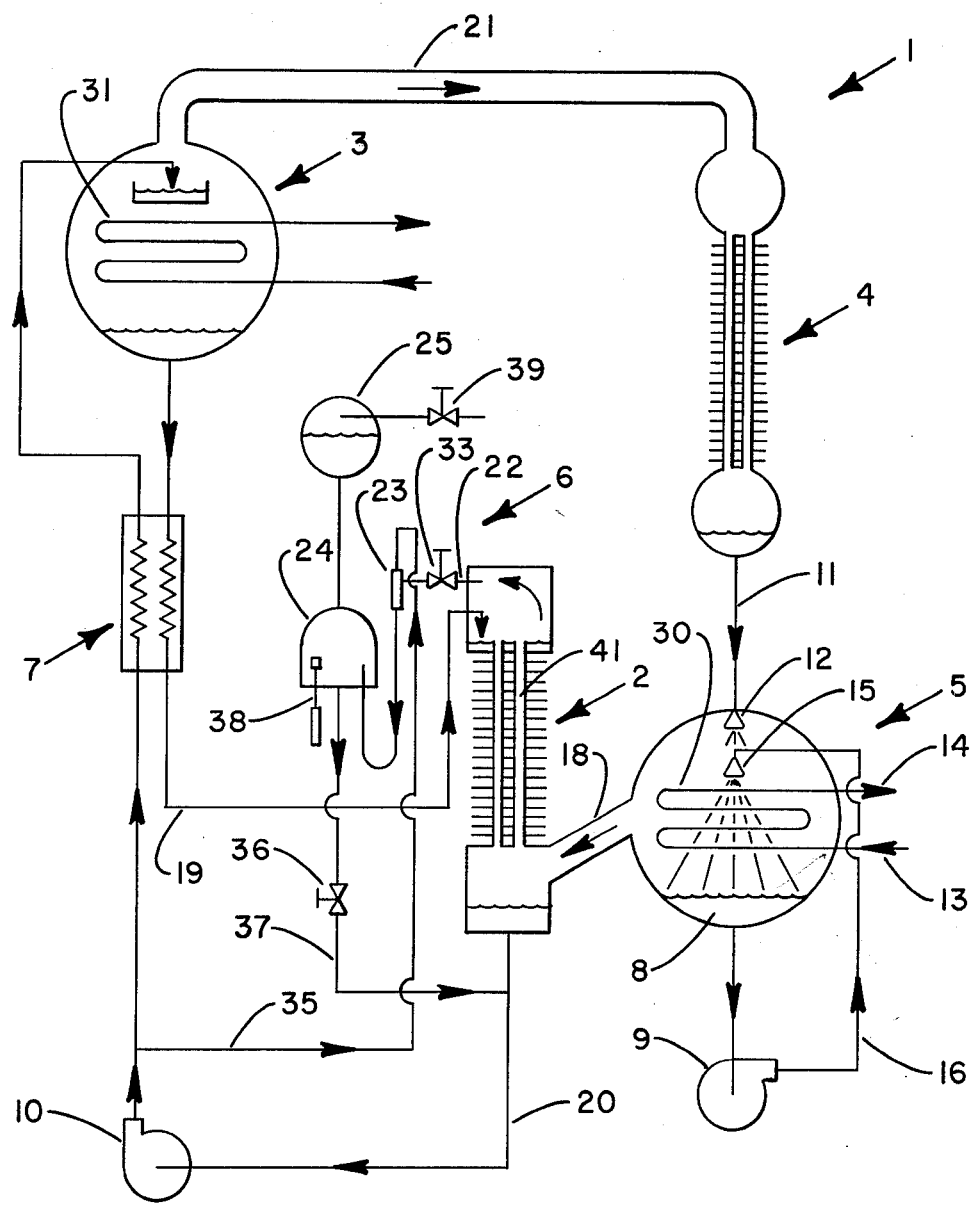
FIG. 1 is a schematic diagram of an absorption refrigeration system having a vertical tube absorber operating according to the principles of the present invention.

Referring to FIG. 1, there is illustrated an air-cooled absorption refrigeration system 1 of a type which employs water as a refrigerant and lithium bromide as an absorbent solution. While pure lithium bromide is not technically a solution, it is customary to refer to the absorbent as being a solution because it may have refrigerant dissolved therein and the term "solution" is therefore used throughout this application to denote the absorbent.

The term "strong" solution is used herein to refer to an absorbent solution which has a high absorbent concentration, such as pure lithium bromide. The term "weak" solution is used to denote an absorbent solution which has a low absorbent concentration because it has a substantial quantity of refrigerant dissolved therein.

It will be appreciated that refrigerants, other than water, and absorbents, other than lithium bromide, may be employed within the scope of this invention, and that various modifications may be made to the refrigeration system 1 to accommodate different absorbents and refrigerants.

The air cooled absorption refrigeration system 1 illustrated in FIG. 1, includes a vertical tube absorber 2 operating according to the principles of the present invention. In addition to the absorber 2, the refrigeration system 1 comprises a generator 3, a condenser 4, an evaporator 5, a purge system 6, and a solution heat exchanger 7. Also, there is a refrigerant pump 9 and a solution pump 10.

Liquid refrigerant condensed in the condenser 4 passes through a refrigerant liquid passage 11 to a refrigerant spray nozzle 12, or a plurality of such nozzles, in the evaporator 5. Also, liquid refrigerant which collects in a sump 8 of the evaporator 5 is pumped by refrigerant pump 9 through a passageway 16 to a second refrigerant spray nozzle 15 or plurality of such nozzles, in the evaporator 5. In this manner, a flow of liquid refrigerant is constantly in contact with heat exchange tubing 30 in the evaporator 5.

A fluid medium, such as water, to be chilled passes into the heat exchange tubing 30 in the evaporator 5 through an inlet line 13, where it is chilled by giving up heat to evaporate refrigerant within the evaporator 5. The chilled medium may then pass out of the heat exchange tubing 30 through an outlet line 14 to suitable remote heat exchangers (not shown), after which it is returned to the evaporator 5 through the inlet line 13 for rechilling. The refrigerant vapor from the evaporator 5 passes through refrigerant vapor passage 18 to the bottom of the absorber 2.

A strong solution inlet passage 19 admits strong absorbent solution from the generator 3 into the top of the absorber 2 so that the strong solution flows down the tubes 41 in the absorber 2 in counterflow to refrigerant vapor from the evaporator 5 flowing up the tubes 41. A weak solution discharge passage 20 provides an inlet to solution pump 10 which pumps the weak solution from the absorber 2 through the solution heat exchanger 7 back to the generator 3.

A cooling medium, such as ambient air, is passed over the absorber 2 to cool the absorbent solution therein to promote the absorption of refrigerant vapor therein. If desired, the same cooling air may also pass over condenser 4 to condense refrigerant therein.

Generator 3 includes a suitable source of heat, such as hot water supplied through tubing 31 in the generator 3, for boiling refrigerant out of the weak solution supplied to the generator 3 from the absorber 2. The refrigerant vapor formed in the generator 3 passes through a discharge passageway 21 into the condenser 4 where it is cooled and condensed by heat exchange with ambient air passing over the condenser 4. The relatively hot, strong absorbent solution collected at the bottom of the generator 3 passes through the solution heat exchanger 7 and through the strong solution inlet passage 19 to the absorber 2 to begin the absorption cycle again.

The purge system 6, as shown in FIG. 1, includes a purge line 22 for collecting non-condensibles from the top of the absorber 2. There is a purge pick up valve 33 in the purge line 22 which is usually open during operation of the absorption refrigeration system 1. A fluid jet pump 23 pumps non-condensibles from the top of the absorber 2 through the purge line 22 into a separation chamber 24 where they are separated by bouyancy and collected in a purge reservoir 25. Weak absorbent solution is supplied through purge supply line 35 to the fluid jet pump 23 to operate the pump 23. The separation chamber 24 contains absorbent solution which absorbes refrigerant vapor which may be drawn into the purge system 6 with the non-condensibles from the top of the absorber 2. A continuous flow of absorbent solution through the purge system 6 is maintained by circulating absorbent solution from the purge chamber 24 back to the absorber weak solution discharge passage 20 through purge return valve 36 in purge return line 37.

In addition to the purge pick up valve 33, the purge return valve 36 usually is open during operation of the absorption refrigeration system 1. However, when non-condensibles build up in the purge reservoir 25 and in the separation chamber 24 this affects the level of absorbent solution in the separation chamber 24 to activate a purge level switch 38 in the separation chamber 24. When activated, the purge level switch 38 operates to energize an operator warning device such as a light or bell (not shown) indicating the need to exhaust the purge reservoir 25. The operator then closes the purge pick up valve 33 and the purge return valve 36, and opens a purge exhaust valve 39 to exhaust the non-condensibles from the system 1. After the non-condensibles are removed, the operator closes the purge exhaust valve 39, and opens the purge pick up valve 33 and the purge return valve 36. In this manner, the purge system 6 is return to its usual operating state.

Figure 2:
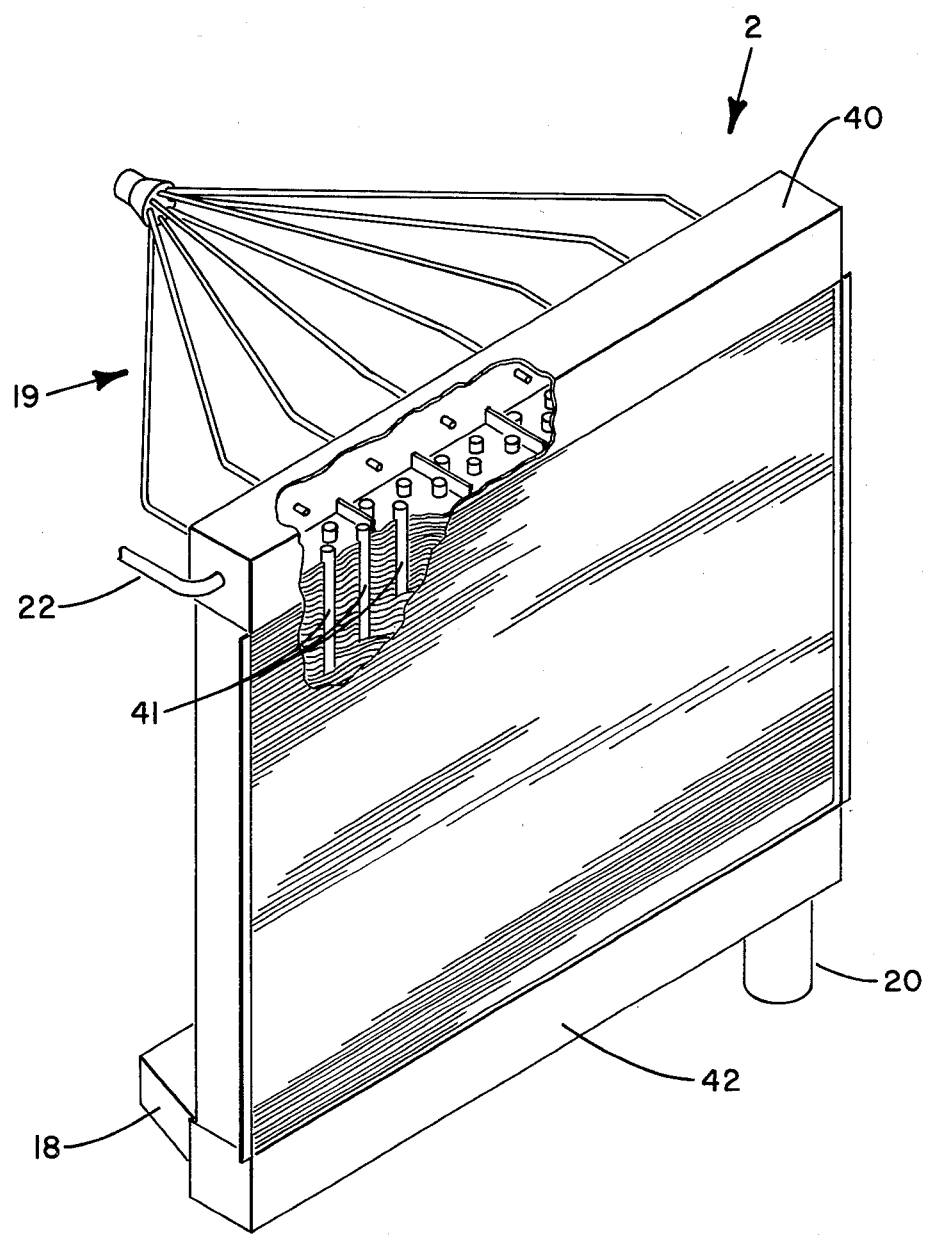
FIG. 2 is a detailed view of the vertical tube absorber shown in FIG. 1.

Referring to FIG. 2, a detailed view is shown of the vertical tube absorber 2 schematically illustrated in FIG. 1. Basically, the absorber 2 comprises a strong solution inlet header 40, absorber tubes 41, and refrigerant vapor inlet header 42. The strong solution inlet passage 19 and the purge line 22 are connected to the strong solution inlet header 40 of the absorber 2 as shown in FIG. 2. Also, the refrigerant vapor passage 18 and the weak solution discharge passage 20 are connected to the refrigerant vapor inlet header 42 of the absorber 2 as shown in FIG. 2. A heat exchange medium, such as air, is continually passed over the absorber tubes 41 to cool the absorber 2 to promote the absorption of the refrigerant vapor by the absorbent solution in the absorber 2. Although the absorber 2 shown in FIG. 2 is comprised of tubes 41, it should be noted that any of a variety of means may be used to provide passageways in the absorber 2 for the flow of absorbent solution and refrigerant vapor.

Figure 3:
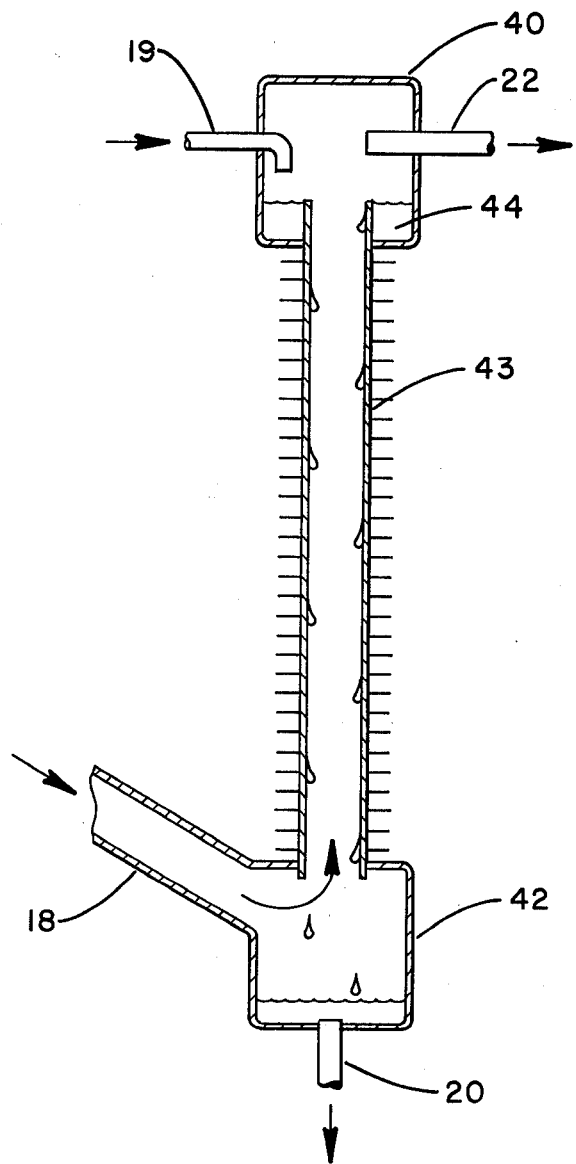
FIG. 3 is a cross-sectional view of one tube in the vertical tube absorber shown in FIG. 2.

Referring to FIG. 3, a cross-sectional view is shown of one tube 43 of the tubes 41 in the absorber 2 shown in FIG. 2. FIG. 3 illustrates the direct counterflow of the strong absorbent solution and the refrigerant vapor in the tubes 41 of the absorber 2. Basically, in operation, the strong absorbent solution is admitted to the strong solution inlet header 40 of the absorber 2 via the strong solution inlet passage 19. Some of the strong solution collects at the bottom 44 of the strong solution header 40 and the remaining solution flows down the inside surfaces of the tubes 41. The refrigerant vapor is admitted to the refrigerant vapor inlet header 42 via the refrigerant vapor passage 18 and the refrigerant vapor flows up through the interior of the tubes 41 in direct opposition to the strong absorbent solution flowing down the inside surfaces of the tubes 41. The absorption refrigeration system 1 is designed by sizing its various components to provide a sufficient volume flow rate of refrigerant vapor to the absorber 2 so that the refrigerant vapor and the absorbent solution are in substantially direct counterflow along the entire length of each of the tubes 41.

The direct counterflow in each of the tubes 41 may create turbulence in the absorber solution flowing down the tubes 41 thereby promoting heat transfer through the tubes 41 from the absorbent solution flowing down the tubes 41 to the heat exchange medium flowing over the outside surfaces of the tubes 41. Also, more effective use is made of the heat transfer surface along the entire length of each of the tubes 41 because there is a more effective utilization of the thermodynamic driving force along the length of each of the tubes 41. More specifically, at the bottom of each of the absorber tubes 41, weak absorbent solution is in contact with relatively high pressure refrigerant vapor while at the top of each of the absorber tubes 41 strong absorbent solution is in contact with relatively low pressure refrigerant vapor thus providing a more even absorption of the refrigerant vapor by the absorbent solution along the length of each of the tubes 41. This counterflow absorption process allows an opportunity for the absorbent solution to absorb more of the refrigerant vapor than is theoretically possible when the absorbent solution and the refrigerant vapor are flowing in the tubes 41 in a parallel flow arrangement.

Also, it should be noted that counterflow in the tubes 41 of the absorber 2 provides an opportunity for improving the purging of non-condensibles from the absorber 2. This is accomplished by purging the non-condensibles from the strong solution inlet header 40 of the absorber 2 via purge line 22 as shown in FIGS. 1, 2, and 3. The non-condensibles are readily collected in the strong solution inlet header 40 since the strong solution in the bottom 44 of the header 40 draws some refrigerant vapor from the absorbent solution at the tops of the absorber tubes 41 into the header 40 thereby sweeping non-condensibles up into the header 40. Also, the non-condensibles tend to collect in the top of the absorber 2 due to their natural buoyancy. The non-condensibles collected via the purge line 22 are expelled from the absorption refrigeration system 1 by the purge 6 system, as described in conjunction with FIG. 1.

Further, it should be noted that while the present invention has been described with respect to an air-cooled, vertical tube absorber, other kinds of absorbers may be constructed and operated using the direct counterflow principle of the present invention. Thus, one should realize that in addition to the various modifications discussed above, other modifications will be apparent to one of ordinary skill in the art to which this invention pertains. Therefore, while the present invention has been described in conjunction with a particular embodiment it is to be understood that various modifications and other embodiments of the present invention may be made without departing from the scope of the invention as described herein and is claimed in the appending claims.

I claim:

1. An absorber for an absorption refrigeration system comprising:
    a plurality of substantially vertical tubes;
    a first header means for directing strong absorbent solution to the tops of the substantially vertical tubes;
    a second header means for directing refrigerant vapor to the bottoms of the substantially vertical tubes at a volume flow rate sufficient to create a direct counterflow of the refrigerant vapor and the strong absorbent solution along the entire length of each of the tubes whereby the refrigerant vapor is absorbed by the strong absorbent solution to form weak absorbent solution;
    means for collecting the weak absorbent solution; and
    purge means for collecting non-condensibles from the first header means and for removing the non-condensibles from the refrigeration system.

2. An absorption refrigeration system comprising:
    a generator means for generating refrigerant vapor and strong absorbent solution by heating weak absorbent solution;
    a condenser means for receiving the refrigerant vapor from the generator means and for condensing the refrigerant vapor to a liquid;
    an evaporator for receiving the liquid refrigerant from the condenser means and for evaporating the liquid refrigerant to cool a medium in heat exchange relationship with the evaporator;
    a vertical tube absorber for receiving, at the top of said absorber, the strong absorbent solution from the generator means and for receiving, at the bottom of said absorber, the refrigerant vapor from the evaporator to create a direct counterflow of refrigerant vapor and absorbent solution inside each tube in said absorber whereby the refrigerant vapor is absorbed by the strong absorbent solution to form a weak absorbent solution which is collected at the bottom of said vertical tube absorber;
    means for supplying the weak absorbent solution from the bottom of the vertical tube absorber to the generator means; and
    a purge system for collecting non-condensibles from the top of the vertical tube absorber and for removing the non-condensibles from the refrigeration system.

3. An absorber for an absorption refrigeration system comprising:
    a plurality of substantially vertical tubes;
    a first header means for directing strong absorbent solution to the tops of the substantially vertical tubes, said first header means including at least one separator plate extending above the tops of the tubes to separate the tops of at least one group of the tubes from the tops of the other tubes;
    a strong solution passage means for supplying strong absorbent solution to the first header means, said strong solution passage means including means for directing strong absorbent solution to each group of tubes separated by the separator plates;
    a second header means for directing refrigerant vapor to the bottoms of the substantially vertical tubes to produce a direct counterflow of refrigerant vapor and strong absorbent solution along the length of each of the tubes whereby the refrigerant vapor is absorbed by the strong absorbent solution to form weak absorbent solution;
    means for collecting the weak absorbent solution; and
    purge means for collecting non-condensibles from the first header means and for removing the non-condensibles from the refrigeration system.

* * * * *